(12) United States Patent
Bauer et al.

(10) Patent No.: US 9,688,380 B2
(45) Date of Patent: Jun. 27, 2017

(54) WINDOW MODULE FOR AN AIRCRAFT OR SPACECRAFT

(71) Applicant: AIRBUS OPERATIONS GMBH, Hamburg (DE)

(72) Inventors: Hans-Achim Bauer, Hamburg (DE); Andre Zybala, Hanstedt (DE)

(73) Assignee: Airbus Operations GmbH, Hamburg (DE)

( * ) Notice: Subject to any disclaimer, the term of this patent is extended or adjusted under 35 U.S.C. 154(b) by 174 days.

(21) Appl. No.: 14/220,935

(22) Filed: Mar. 20, 2014

(65) Prior Publication Data

US 2014/0253012 A1 Sep. 11, 2014

Related U.S. Application Data

(63) Continuation of application No. PCT/EP2012/068908, filed on Sep. 26, 2012.

(60) Provisional application No. 61/541,498, filed on Sep. 30, 2011.

(30) Foreign Application Priority Data

Sep. 30, 2011 (DE) .................. 10 2011 083 810

(51) Int. Cl.
*H02J 7/00* (2006.01)
*B64C 1/14* (2006.01)
*B64D 11/00* (2006.01)
*H02J 7/35* (2006.01)
*H02S 20/00* (2014.01)

(52) U.S. Cl.
CPC ........ *B64C 1/1492* (2013.01); *B64D 11/0015* (2013.01); *B64D 11/00155* (2014.12); *H02J 7/35* (2013.01); *H02S 20/00* (2013.01); *B64D 2211/00* (2013.01)

(58) Field of Classification Search
CPC . H02J 7/35; H02J 7/355; Y02E 60/12; H01M 10/465; H01M 16/006
USPC ........................................................ 320/101
See application file for complete search history.

(56) References Cited

U.S. PATENT DOCUMENTS 4,414,254 A * 11/1983 Iwata .................. B05D 5/06
428/216
5,221,363 A * 6/1993 Gillard .................. E06B 9/264
136/248
5,228,925 A * 7/1993 Nath .................. H01L 31/048
136/251

(Continued)

FOREIGN PATENT DOCUMENTS

CN 101101181 A 1/2008
CN 201883857 U 6/2011
(Continued)

OTHER PUBLICATIONS

Chinese Office Action for Application No. 2012800472571 dated Feb. 2, 2015.

(Continued)

*Primary Examiner* — Arun Williams
(74) *Attorney, Agent, or Firm* — Jenkins, Wilson, Taylor & Hunt, P.A.

(57) ABSTRACT

The present disclosure pertains to a window module for an aircraft or spacecraft, including a window frame which comprises, at least in portions, a current-generating element for generating an electric current.

14 Claims, 2 Drawing Sheets

(56) References Cited

U.S. PATENT DOCUMENTS

| | | | |
|---|---|---|---|
| 8,672,258 B1* | 3/2014 | Tillotson | B64C 1/1484 244/1 R |
| 2003/0010378 A1* | 1/2003 | Yoda | B32B 17/10055 136/251 |
| 2008/0230653 A1 | 9/2008 | Mitchell et al. | |
| 2009/0173008 A1* | 7/2009 | Huang | E06B 7/086 49/74.1 |
| 2010/0316886 A1* | 12/2010 | Rashid | B32B 27/30 428/623 |
| 2012/0120643 A1* | 5/2012 | Meng | B82Y 10/00 362/183 |

FOREIGN PATENT DOCUMENTS

| | | |
|---|---|---|
| CN | 102185531 A | 9/2011 |
| DE | 10 2005 002 545 A1 | 7/2006 |
| DE | 10 2005 046 729 A1 | 4/2007 |
| DE | 10 2008 007 586 A1 | 8/2009 |
| DE | 10 2010 028 945 A1 | 12/2010 |
| DE | 10 2010 000 893 A1 | 7/2011 |
| WO | WO 2013/045466 A1 | 4/2013 |

OTHER PUBLICATIONS

Chinese Office Action for Application No. 201280047257.1 dated Aug. 11, 2015.
International Search Report for Application No. PCT/EP2012/068908 dated Dec. 21, 2012.
German Office Action for Application No. 10 2011 083 810.4 dated Mar. 20, 2013.

* cited by examiner

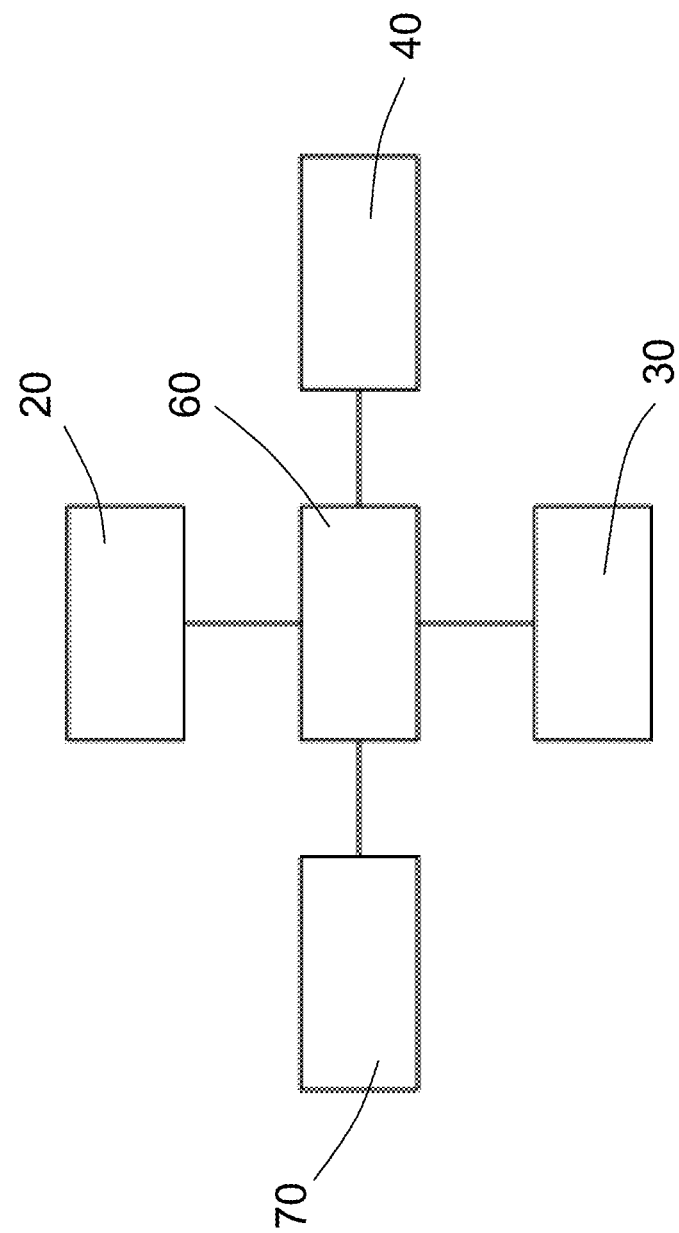

WINDOW MODULE FOR AN AIRCRAFT OR SPACECRAFT

CROSS-REFERENCES TO RELATED APPLICATIONS

This application is a continuation of and claims priority to PCT/EP2012/068908 filed Sep. 26, 2012, which claims the benefit of and priority to U.S. Provisional Application No. 61/541,498, filed Sep. 30, 2011 and German Patent Application No. 10 2011 083 810.4, filed Sep. 30, 2011, the entire disclosures of which are herein incorporated by reference.

TECHNICAL FIELD

The present invention relates to a window module for an aircraft or spacecraft.

Although applicable to any window modules in an aircraft or spacecraft, the present invention and the problem on which it is based will be explained in detail with reference to an aircraft.

BACKGROUND

In the aircraft cabin, there is usually the possibility to provide passengers with the opportunity to charge electronic devices at their seat through the electrical on-board network. For this purpose, there is a universal socket at the seat which provides a voltage of 110 V. This socket is configured in such a way that it is suitable for the operation of laptops having a power of approximately 50-70 W. Connecting said socket to the electrical on-board network of the aircraft requires wiring of the seat, whereby, when exchanging the seat or changing the seat configuration in the aircraft cabin, all of the cable connections have to be disconnected and then reconnected again.

Furthermore, in recent years laptops have begun to be increasingly replaced by tablet PCs, such as the iPad, or by smartphones. This category of high-powered but energy-saving devices is referred to as what are known as personal electronic devices (PEDs).

From the prior art according to DE 10 2005 002 545 A1, an energy buffer device in an aircraft is known, by means of which electronic devices, which are usually only in operation for a short amount of time, can be operated independently. However, this is disadvantageous in that the energy buffer device has to be connected via the electrical on-board network of the aircraft for charging its energy storage unit, whereby a cable connection is required for connecting to the electrical on-board network.

Furthermore, from the prior art according to DE 10 2005 046 729 A1, an energy supply system is known in which energy is supplied to an electrical consumer via a fuel cell. However, this is disadvantageous in that an energy supply system of this type can in turn be used as a central system for providing electrical energy for the electrical on-board network, which has to be connected to the seats in the aircraft cabin via cables in a known manner.

SUMMARY

It is therefore an idea of the present invention to provide a device for charging or electrically operating electronic devices for an aircraft or a spacecraft, which device can be easily retrofitted or exchanged independently of the electrical on-board network.

According thereto, a window module comprising a window frame is provided, which window frame comprises a current-generating element for generating an electric current.

The idea on which the present invention is based consists in using the hitherto unused region of the window frame for generating electric current and using this for charging and/or operating an electronic device, whereby the burden on the electrical on-board network of the aircraft is relieved. In particular, the incident sunlight and/or the light from the cabin illumination system can be used for generating the electric current.

An advantage of the present invention is that the present window module provides an energy source for electronic devices having a low electrical power, which energy source is independent of the aircraft infrastructure and therefore is not connected to the electrical on-board network of the aircraft. In addition, the cable connection at the seat for connecting to the electrical on-board network can advantageously be omitted, whereby refitting seats in another seat arrangement or exchanging seats is made easier.

Furthermore, the present invention advantageously allows the associated control electronics for the current-generating element to be integrated into the region of the aircraft inner lining, which at the same time is a component of the window module. Existing window modules can therefore easily be exchanged for the present window module.

Advantageous configurations and improvements of the invention are set out in the dependent claims.

According to a configuration, the current-generating element is arranged in the region of the inner surface of the window frame. The largest possible region for generating electric current can therefore be exploited for the arrangement of the current-generating element.

According to a further configuration, the current-generating element generates the electric current by means of a photoelectric element. The current-generating element can therefore for example be a solar cell which can generate the electric current cost-effectively during the flight.

According to a further configuration, the current-generating element is a polymeric organic solar cell. A solar cell of this type can be imprinted on the window frame of the window module and has a very low thickness. At the same time, the polymeric organic solar cell can cover substantially the entire inner surface of the window frame, whereby a maximum possible region for generating the electric current is available.

According to a further configuration, the geometric configuration of the current-generating element is substantially identical to the geometric configuration of the associated underlying region of the window frame. Owing to this, the shape of the current-generating element can follow the shape of the associated region of the window frame and regions having a curved geometry can therefore be covered by the current-generating element and used for generating the electric current.

According to a further configuration, the window module comprises an interface for transmitting the electric current generated by the current-generating element to an electronic device. In this connection, a USB interface is preferably used, which is present on the majority of available PEDs.

According to a further configuration, means for controlling the charging process for the electronic device and/or an electrical storage unit are further provided on the window frame. A charge controller for charging the electronic device can thus preferably be provided, which interrupts charging when the available electric current is too low or prevents the electronic device from overcharging. The electrical storage unit can advantageously bridge a period of time for supplying or charging the electronic device during which a sufficient amount of electric current cannot be made available by the current-generating element.

According to a further configuration, the interface for transmitting the generated electric current is arranged in the lower region of the window frame. The existing charging cable for the electronic device can therefore also be used in the aircraft, while the electronic device can for example be placed on the tray table of the aircraft seat.

According to a further configuration, the window module is of a modular construction, consisting of the individual components. This advantageously means that, in the case of exchanging an existing window module or retrofitting in an existing aircraft, only the window module has to be removed as a modular component, no functional or electrical interfaces to the aircraft infrastructure having to be disconnected, whereby exchange or retrofitting can be carried out rapidly and at little cost.

According to a further configuration, the thickness of the current-generating element is considerably less than the respective thickness of the associated region of the window frame. This advantageously leads to the current-generating element behaving in a resiliently flexible manner owing to its low thickness, in such a way that the shape of the current-generating element can follow the shape of the associated region of the window frame and regions having a curved geometry can therefore also be covered by the current-generating element and used for generating the electric current.

According to a further configuration, a window pane is further provided, of which the material properties are selected in such a way that the absorption of the wavelength, which the energy generation in the current-generating element causes, of the light entering during operation is as low as possible. Owing to this, the wavelength available for energy generation in the current-generating element can be converted into electrical energy in the best possible manner.

According to a further configuration, the mechanical interfaces for connecting the window module to the aircraft or spacecraft correspond to the mechanical interfaces which are conventionally used for a window module. The present window module can therefore be retrofitted in existing aircraft at little cost. Furthermore, in this case the existing infrastructure of the aircraft does not have to be altered for the exchange, and therefore cost-effective retrofitting is possible.

According to a further configuration, the current-generating element comprises lenses for focusing and amplifying the incident light. Said lenses are preferably arranged in the region of the outer surface of the current-generating element. Furthermore, the material properties of the lenses are preferably selected in such a way that the absorption of the wavelength, which the energy generation in the current-generating element causes, of the light entering during operation is as low as possible. Owing to this, the wavelength available for energy generation in the current-generating element can be converted into electrical energy in the best possible manner.

Furthermore, an aircraft or spacecraft having at least one window module according to the present invention is disclosed.

BRIEF DESCRIPTION OF THE DRAWINGS

The invention will be describes in detail by way of embodiments with reference to the accompanying figures of the drawings.

In the figures:

FIG. 2 is a schematic block diagram of a circuit arrangement for the functional components of the window module according to the invention.

In the figures, like reference numerals denote like or functionally like components, unless indicated otherwise.

DETAILED DESCRIPTION

Figure 1:
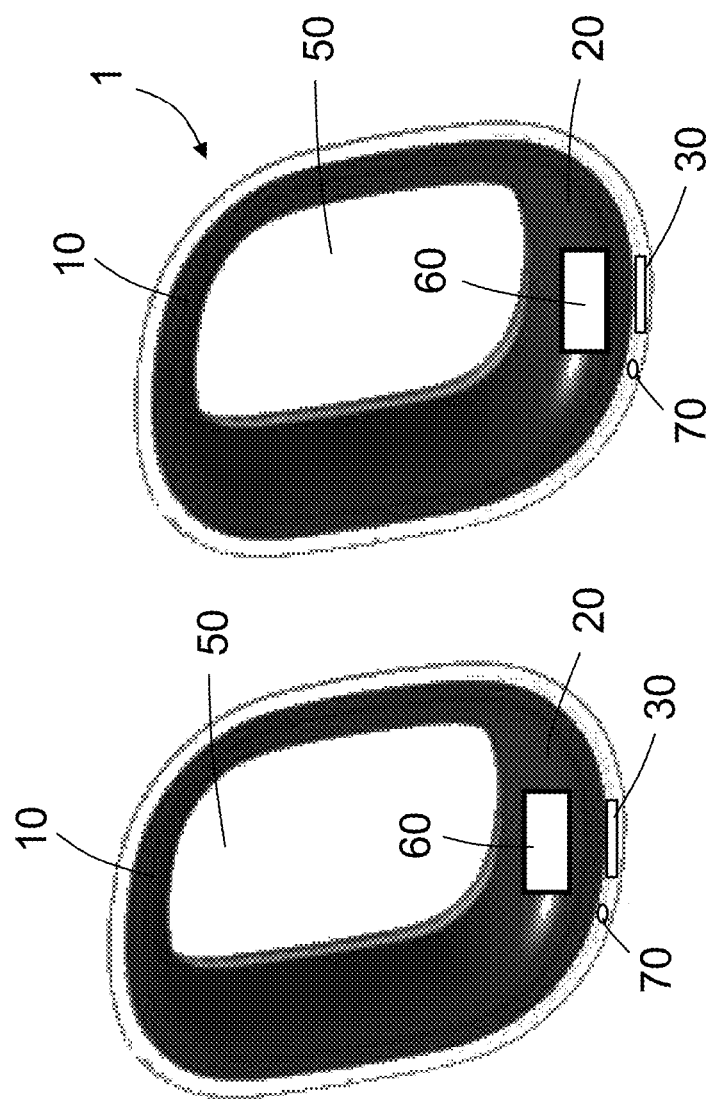
FIG. 1 is a perspective view of a window module according to the invention for an aircraft.

FIG. 1 is a perspective view of a window module 1 according to the invention for an aircraft (not shown), which module comprises a window frame 10, a window pane 50 arranged inside the window frame 10 and a current-generating element 20.

The current-generating element 20 may be a solar cell which is arranged in the region of the inner surface of the window frame 10. The solar cell covers the region of the inner surface of the window frame 10 at least in portions and is preferably arranged in the region which is illuminated most intensively or for the longest period of time by the sun and/or the cabin illumination system during the flight. This may be the lower region of the inner surface of the window frame 10. Furthermore, a plurality of solar cells is preferably arranged in the region of the inner surface of the window frame 10 in such a way that as high an electrical power as possible can be made available for electrically supplying the electronic device to be charged.

In addition, the window module 1 can also comprise an electrical storage unit (not shown) which receives the electrical energy generated by the solar cell and stores it until the next time the electronic device is charged.

Furthermore, the window frame 10 comprises, in the region of the outer surface thereof, an interface 30 for transmitting the electric current generated by the solar cell to the electronic device. The interface 30 is preferably a standardised interface, such as a USB interface, which lends itself in particular to PEDs. In the region next to the interface 30, an indicator light 70 is arranged on the window frame 10 and visually indicates to the passenger the occurrence of a fault when the electronic device is being charged or supplied.

A charge controller 60 is arranged on the rear face of the window frame 10, is mounted on the window frame 10 and is not visible when the window module 1 is installed in the aircraft cabin since it is covered by the window frame 10. The charge controller 60 controls the charging process for transmitting the electric current generated by the solar cell to the electronic device via the interface 30, taking into account the electrical storage unit if this is provided.

The window module 1 may be of a modular construction, consisting of the above-mentioned individual components. Owing to this, an existing window module can be advantageously exchanged for the present window module at little cost, since the mechanical interfaces thereof are identical to those for connecting a conventional window module to the fuselage structure of the aircraft. Furthermore, in the event of a defect in an electronic component of the present window module, the module can simply be removed and selectively replaced with a new window module or the faulty electronic component of the present window module can be replaced.

FIG. 2 is a schematic block diagram of a circuit arrangement for the functional components of the window module according to the invention. A solar cell 20 generates an electric current and provides this to a charge controller 60. The charge controller 60 monitors the current flow to a USB interface 30. The USB interface 30 charges and/or supplies an electronic device (not shown) with electrical energy which is generated by the solar cell 20.

The charge controller 60 is further electrically connected to an electrical storage unit 40. If no electronic device to be charged is connected to the USB interface 30, the electrical energy generated by the solar cell 20 is provided to the electrical storage unit 40 and charges it. In addition, the electrical storage unit 40 absorbs current peaks and can provide an (auxiliary) electric current for charging or supplying the electronic device in a situation in which the solar cell 20 can only generate relatively little electric current due to unfavourable light conditions.

Furthermore, an indicator light 70 is provided which is electrically connected to the charge controller 60. The indicator light 70 indicates to a passenger the overall operational availability of the USB interface 30 for charging or supplying the electronic device.

The current flow towards the USB interface 30 is monitored by the charge controller 60 when the electronic device is charging. If an overload occurs with respect to the amount of current which is currently required by the electronic device, the USB interface 30 is deactivated and the occurrence of this fault is indicated to the passenger by an associated signal at the indicator light 70. In the event that the window module currently cannot provide enough electric current available for charging the electronic device via the USB interface 30, because for example the solar cell 20 currently is not receiving enough light energy, this is then also indicated to the passenger by means of the indicator light 70.

Although the present invention has been described herein on the basis of preferred embodiments, it is not restricted thereto, but can be modified in various ways.

For example, the material properties of the window pane may be selected in such a way that the absorption of the wavelength, which the energy generation in the current-generating element causes, of the light entering during operation is as low as possible.

What is claimed is:

1. A window module for an aircraft or spacecraft, comprising a window frame which comprises, at least in portions, a current-generating element configured to generate an electric current, wherein the window module comprises an interface configured to transmit the electric current from the current-generating element to a personal electronic device inside the aircraft or spacecraft.

2. The window module according to claim 1, wherein the current-generating element is arranged in a region of an inner surface of the window frame.

3. The window module according to claim 1, wherein the current-generating element comprises a photoelectric element for generating the electric current.

4. The window module according to claim 1, wherein the current-generating element is a polymeric organic solar cell.

5. The window module according to claim 4, wherein a geometric configuration of the current-generating element is substantially identical to a geometric configuration of an associated underlying region of the window frame.

6. The window module according to claim 4, wherein substantially an entire inner surface of the window frame comprises one or more polymeric organic solar cells.

7. The window module according to claim 1, wherein the window frame comprises a controller configured to control a charging process for the personal electronic device and/or an electrical storage unit.

8. The window module according to claim 7, wherein the interface is arranged in a lower region of the window frame.

9. The window module according to claim 1, wherein the window module comprises a modular construction of individual components.

10. The window module according to claim 1, wherein a thickness of the current-generating element is considerably less than a respective thickness of an associated region of the window frame.

11. The window module according to claim 1, further comprising a window pane having material properties selected such that an absorption of a wavelength of light entering during operation is as low as possible.

12. The window module according to claim 1, wherein mechanical interfaces configured to connect the window module to the aircraft or spacecraft correspond to mechanical interfaces which are conventionally used for a window module.

13. The window module according to claim 1, wherein the current-generating element comprises lenses configured to focus and amplify incident light.

14. An aircraft or spacecraft having at least one window module according to claim 1.

* * * * *